United States Patent [19]

Richman

[11] Patent Number: 4,580,295
[45] Date of Patent: Apr. 1, 1986

[54] SYSTEM FOR MONITORING OPTICAL DATA BUS TRANSMISSIONS

[75] Inventor: Jay L. Richman, Montville, N.J.

[73] Assignee: Allied Corporation, Morris Township, Morrris County, N.J.

[21] Appl. No.: 559,119

[22] Filed: Dec. 7, 1983

[51] Int. Cl.$^4$ ................................. H04B 9/00
[52] U.S. Cl. ........................... 455/618; 455/608; 455/617; 340/825.64; 377/20
[58] Field of Search ............... 455/618, 613, 606, 617, 455/608, 115; 324/79 D; 371/62; 340/825.06, 825.63, 825.64, 526; 307/234; 328/111; 329/106; 377/20

[56] References Cited

U.S. PATENT DOCUMENTS 3,641,549 2/1972 Misek et al. .................... 340/526
4,390,843 6/1983 Betts et al. ..................... 328/111

OTHER PUBLICATIONS

Carnes, M. L., R. M. Correy, "Processor Checking", IBM Technical Disclosure Bulletin, vol. 17, No. 11, Apr. 1975.

Primary Examiner—Robert L. Griffin
Assistant Examiner—Timothy K. Greer
Attorney, Agent, or Firm—Stanley N. Protigal; Howard G. Massung

[57] ABSTRACT

A circuit (2) used to monitor an electro-optic transmitter (1) associated with an optical data bus (17) senses voltage levels $V_A$ applied to an optical transducer (15). The voltage levels $V_A$ are compared to a reference voltage $V_{REF}$ in order to provide transition signals which change state at predetermined transition crossings. The transition signals are applied as up-count signals to a counter (27). If the counter (27) detects a minimum number of transitions within a given time period, the counter (27) provides an output signal, which is used to provide an indication that the optical transmitter circuit (1) is transmitting data. The monitoring circuit (2) takes advantage of necessary voltage conditions in order to simply and positively provide an indication of the operability of an electro-optical transmitter circuit (1). This ability to detect faults enhances the reliability of a system using optical data bus communications.

13 Claims, 1 Drawing Figure

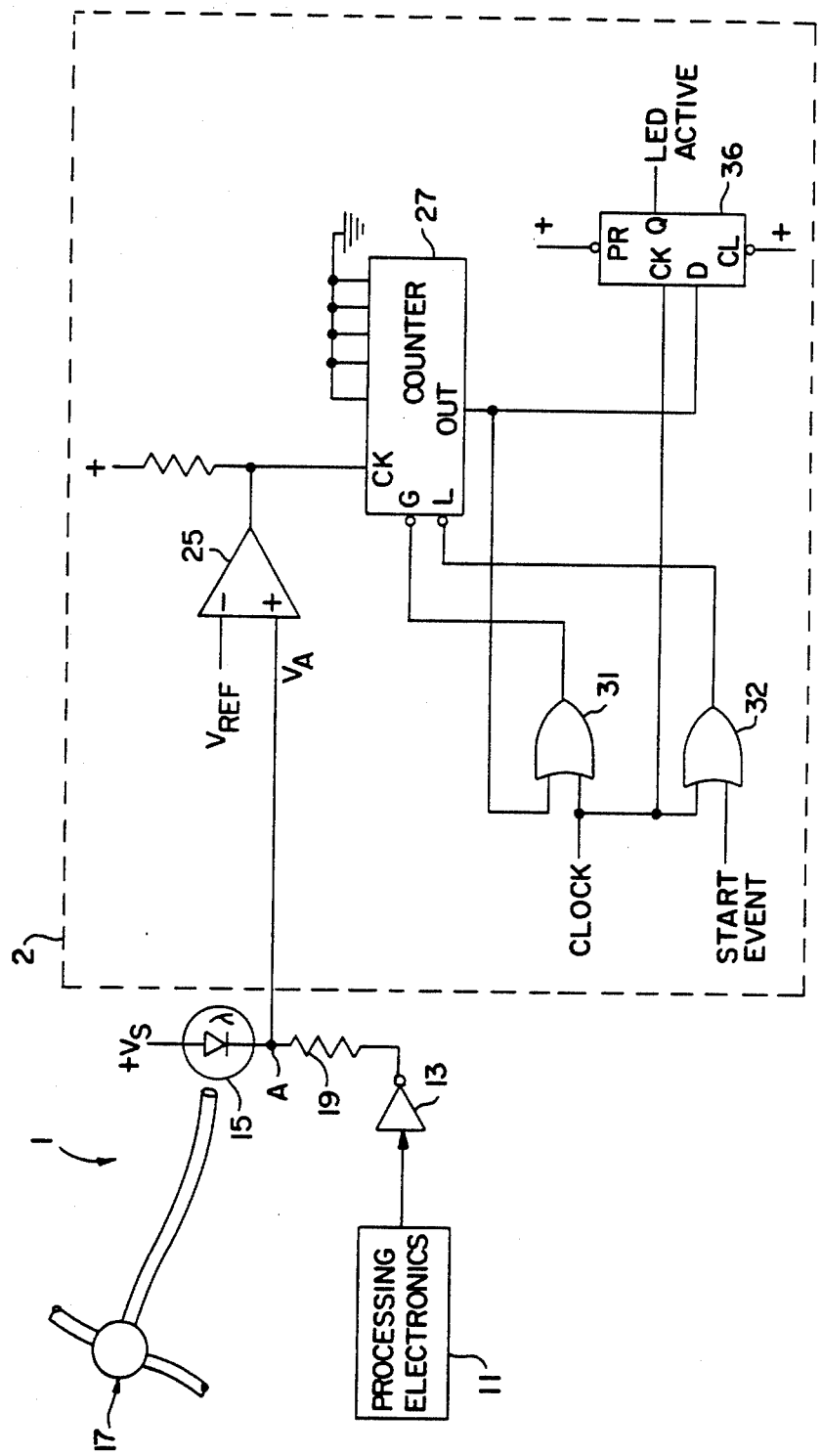

SYSTEM FOR MONITORING OPTICAL DATA BUS TRANSMISSIONS

BACKGROUND OF THE INVENTION

This invention relates to communication data buses. In particular, the invention relates to optical multiplex data buses, and to the monitoring of electro-optical transducers used to communicate with the bus.

Present multiplex data bus technology using electrical conductors is exemplified by the bipolar Manchester-encoded bus, which is well-known in the art. While this system performs adequately in systems with data rates of up to 10 MHZ, efforts must be expended to guarantee its performance in certain environments such as in aircraft. Some of the problems encountered are ground loops, radiated and induced noise, amplitude variation and the cost and weight involved in coupling different devices to the wire cable. In order to solve some of these problems, optical multiplex buses have been developed. The optical bus substantially reduces noise, cross talk, and ground loops. Other advantages include freedom from intermittent connections and short circuits, an ability to electrically isolate interconnected redundant systems and safety in explosive environments. While early optical multiplex bus applications have attempted to imitate standard bus design, such as the MIL-STD-1553 bus, later applications sought to utilize the greater band width, lighter weight, and potentially lower cost of electro-optic technology.

Electro-optic communication systems contain three basic blocks:

(1) a transmitter which converts electrical signals to light. The signals may be at different logic levels for digital communications.
(2) An optical cable which couples the light signals to various transmitting and receiving systems.
(3) A receiver which converts light from the cable to electrical signals, including logic levels for digital communications.

It is desirable that the system be monitored, particularly at the transmitter, in order to determine whether signals are being properly transmitted by the transmitter. This would allow fault isolation between systems and alert an internal computer or other monitor so as to signal failure in transmission. Typically, the transmitter is a light emitting diode (LED) or laser diode, driven by a driver amplifier. The principle failure modes for both the diode and the driver are open and short circuits. The present invention is directed to circuitry which is able to monitor circuit conditions which appear between the driver and diode when the transmitter is operating.

It is accordingly an object of the present invention to provide a more reliable and efficient form of data communication between electronic systems and components. This is particularly significant in data buses used on aircraft having numerous electronic systems on board. It is further desired to provide a communication system such as an optical data bus which provides a higher data rate than a conventional Manchester-encoded wire pair electrical multiplex bus, in which the reliability of transmission through the data bus is assured. It is a further object to provide a fault isolation system for use with transmitters for an optical data bus.

SUMMARY OF THE INVENTION

In accordance with the present invention, a circuit for monitoring the output of an electro-optic transmitter is connected to the electrical input of the transmitter element in order to sense voltage transitions such as would occur during data transmission when the transmitter is properly functioning. The sensed voltage transitions are used as count signals by a counter. The counter is reset at the start of an event to be monitored. If the number of voltage transitions exceeds a predetermined rate, the counter reaches a maximum count, indicating that the transmitter is active and is transmitting optical signals. The indication can be an output discrete signal or can provide an internal signal indicating the status of the system.

Advantages include an ability to efficiently monitor the electro-optic data transmission circuit and an ability to determine proper operation of the circuit independently of the particular data format being transmitted. This achieves a fault isolation in which failure in electro-optic transmission is segregated from failure resulting from faulty data generation.

BRIEF DESCRIPTION OF THE DRAWINGS

The drawing FIGURE shows a block diagram of the optical data bus monitoring circuit constructed in accordance with the preferred embodiment of the invention.

DETAILED DESCRIPTION OF THE PREFERRED EMBODIMENT

Referring to the drawing FIGURE, an electro-optic transmitter circuit 1 is monitored by an optical transmitter monitor circuit 2. In the transmitter 1, transmission of optical data communication signals is accomplished by processing the data to be communicated with processing electronics generally indicated by block 11. The signal from the processing electronics 11 is amplified by a driver amplifier 13, which drives a light emitting element, such as a light emitting diode (LED) 15 or a laser diode. The LED 15 responds to signals from the driver amplifier 13 in order to provide an output which is modulated by the signal from the processing electronics 11. Therefore, element 15 can be any kind of circuit element that is capable of transmitting a modulated optical output at transmitted signal rates. The optical signal is provided to an optical data bus 17 for transmission to other components (not shown) along with signals transmitted by different transmitters (not shown). Signals from the driver amplifier 13 pass through a resistor 19 prior to being received by the LED 15 in order that current levels to the LED 15 are appropriately attenuated. The voltage levels at the driver 13 and resistor 19 and of the LED 15 are representative of the modulated signal applied to the LED 15 are are also representative of the optical output of the LED 15, assuming the LED 15 is operational. The LED 15, like most diodes and signal emitters, tends to go to an open circuit or short circuit condition upon failure. Likewise, if the processing electronics 11 or the driver amplifier 13 fails, the output from the driver amplifier 13, as presented to the LED 15, tends to present or imitate an open or short circuit at the output of the driver amplifier 13. The LED 15 has one electrode connected to the resistor 19 at circuit point "A". The LED's other electrode is biased at a predetermined level, $V_s$ (forward bias of $V_s$). If the operating voltage of the LED 15 is indicated $V_{LED}$, the voltage $V_A$ at circuit point "A" would appear as follows:

| Failed Device | | Failure Mode | | |
|---|---|---|---|---|
| LED 15 | driver amp 13 | Open | Short | $V_A$ |
| X | | | X | $V_s$ |
| | X | X | | $V_s$ |
| X | | X | | 0 |
| | X | | X | $V_s - V_{LED}$ |
| — | (no failure) | — | varies at modulation rate | |

From this chart, it can be seen that the value of the $V_A$ is, by itself, not sufficient to determine whether the LED 15 or the driver amplifier 13 are providing appropriate signals. On the other hand, when the LED 15 is transmitting appropriate signals to the optical data bus 17 the voltage at point A is changing at a certain given rate between voltage peaks and valleys. Consequently, during proper operation of the LED 15, the voltage V at circuit point A passes a transition value at a frequency determined by the data rate. By determining a minimum number of transitions per unit of time at circuit point A and by verifying that minimum number, the status of the LED 15 and the driver amplifier 13 can be monitored.

As can be seen in the drawing FIGURE, the voltage at point A is provided to a comparator amplifier 25 which compares the voltage $V_A$ at circuit point A to a reference voltage $V_{REF}$. The reference voltage $V_{REF}$ is set at the midpoint of the expected transition voltage of the LED 15 at circuit point A. Therefore, whenever the voltage at circuit point A passes a transition value, the comparator amplifier 25 changes its signal between "off" and "on" states. The output from the comparator amplifier 25 is provided to a counter 27 and is used to provide a count signal to the counter 27 at every second transition of $V_A$.

The counter 27 is enabled by a clock signal which allows a first OR gate 31 to provide an "enable" signal to the counter 27. When a predetermined maximum count is achieved by the counter 27, the first OR gate 31 removes its "enable" signal to the counter 27 so that the counter 27 is enabled whenever the clock signal is in a low level state and the maximum count has not been reached. A second OR gate 32 responds to a "start event" pulse or the clock signal. The "start event" pulse can be, for example, a synchronization signal, a signal from the processing electronics 11, a signal from a manually operated switch or any other convenient signal. The counter 27 is cleared upon the appropriate "start event" signal, as provided to the transition counter 27 by the second OR gate 32. Since the clock signal is also provided to the second OR gate 32, the counter 27 is reset when both the clock and the "start event" signals are in the low state.

When the counter 27 achieves the maximum count of transitions from the comparator amp 25, the counter 27 provides the maximum count signal to a D-type flip flop 36. The D-type flip flop 36 provides an indication that the LED 15 is providing a modulated signal, for a time period determined by the clock signal, for annunciation of the proper operation of the transmitter circuitry.

The components for the monitoring circuitry are well known to those skilled in the art. In the preferred embodiment, the components are selected as follows: The comparator amp 25 is a ¼ LM 139 amplifier, provided by National Semiconductor (U.S.A.) of Santa Clara, Calif. The counter 27 is an LS 191 counter, sold by Texas Instruments of Dallas, Tex. The OR dates 31, 32 are both ¼ LS 32 OR gates, sold by Texas Instruments, and the D-type flip flop 36 is a ½ LS 74 flip flop, also sold by Texas Instruments. The clock signal is preferably provided at 10 Hz, so that if the counter 27 is set for measuring fifteen transitions, the fifteen transitions must occur during a 50 ms period, and the D-type flip flop 36 maintains its "LED active" signal for 100 ms.

As can be seen, the above embodiment is a specific example of the inventive concept of monitoring the occurrence of specific electrical events in the transmission system. The described monitoring circuit 2 can be modified to provide additional information, such as voltages at different circuit points. The invention can also be utilized in monitoring the status of other electro-optic components in a communicating system. The above description is therefore not intended to be limited to specific components and configurations. For this reason, it is intended that the invention be read as limited only by the claims.

What is claimed is:

1. Monitoring system for a signal converter having at least one electro-optical transducer element, which has an electrical transducer signal level at one electrical connection which varies in response to multiplexed data being optically transmitted through the transducer element, characterized by:
    means to compare the transducer signal level to a predetermined signal level, said means to compare providing a threshold detection signal which changes state whenever the transducer signal level passes the predetermined signal level;
    clock means providing clock signal pulses;
    a counter connected to said means to compare for receiving the threshold detection signal, the counter receiving the clock signal pulses, the counter providing a confirmation output whenever a ratio of clock signal pulses and a change in state of the transducer signal exceeds a predetermined ratio.

2. Monitoring system as described in claim 1, further characterized by:
    the transducer signal level being provided as a voltage-variable signal to said means to compare; and
    the predetermined signal level being a reference voltage.

3. Monitoring system as described in claim 1, further characterized by:
    the counter and the means to compare verifying whether a minimum number of changes of state of the transducer signal occurs and further indicates whether a light emitting diode or a driver amplifier in the signal convertor has failed and resulted in the transducer signal levels as follows:

| Failed Device | | Failure Mode | | |
|---|---|---|---|---|
| LED | driver amp | Open | Short | $V_A$ |
| X | | | X | $V_s$ |
| | X | X | | $V_s$ |
| X | | X | | 0 |
| | X | | X | $V_s - V_{LED}$ |
| — | (no failure) | — | varies at modulation rate, | | wherein LED is the light emitting diode, driver amp is the driver amplifier, V is the transition signal lever, $V_s$ a foward bias level of the light emitting diode and $V_{LED}$ is an operating voltage of the light emitting diode.

4. Monitoring system as described in claim 1, further characterized by:

a switching device receiving the clock signal pulses and connected to the counter so as to receive the confirmation output, the switching device providing an affirmative signal in response to the confirmation output or and maintaining the affirmative signal for a time period determined, at least in part, by the clock signal pulses, thereby allowing successive confirmation outputs to maintain provision of the affirmative signal.

5. Monitoring system as described in claim 4, further characterized by:

the counter and the means to compare verifying whether a minimum number of changes of state of the transducer signal occurs and further indicates whether a light emitting diode or a driver amplifier in the signal convertor has failed and resulted in the transducer signal levels as follows:

| Failed Device | | Failure Mode | | |
|---|---|---|---|---|
| LED | driver amp | Open | Short | $V_A$ |
| X | | | X | $V_s$ |
| | X | X | | $V_s$ |
| X | | X | | 0 |
| | X | | X | $V_s - V_{LED}$ |
| — | (no failure) | — | | varies at modulation rate. | wherein LED is the light emitting diode, driver amp is the driver amplifier, V is the transition signal level, $V_s$ a foward bias level of the light emitting diode and $V_{LED}$ is an operating voltage of the light emitting diode.

6. Monitoring system as described in claim 1, further characterized by:

the transducer signal level being a voltage level at the electrical connection;

the electrical connection being an electrode of the transducer element; and the predetermined signal level being a reference voltage.

7. Monitoring system as described in claim 6, further characterized by:

the transducer element being a diode which converts electrical energy into light energy.

8. Monitoring system as described in claim 6, further characterized by:

the counter and the means to compare verifying whether a minimum number of changes of state of the transducer signal occurs and further indicates whether a light emitting diode or a driver amplifier in the signal convertor has failed and resulted in the transducer signal levels as follows:

| Failed Device | | Failure Mode | | |
|---|---|---|---|---|
| LED | driver amp | Open | Short | $V_A$ |
| X | | | X | $V_s$ |
| | X | X | | $V_s$ |
| X | | X | | 0 |
| | X | | X | $V_s - V_{LED}$ |
| — | (no failure) | — | | varies at modulation rate. | wherein LED is the light emitting diode, driver amp is the driver amplifier, V is the transition signal level, $V_s$ a foward bias level of the light emitting diode and $V_{LED}$ is an operating voltage of the light emitting diode.

9. Monitoring system for an electro-optical converter which transmits information as Manchester-encoded data on an optical data bus, in which a transducer element has at least one electrical connection and the electrical connection has a transducer signal level which varies in response to the Manchester-encoded data being supplied to the transducer element, characterized by:

means for providing a threshold detection signal which changes state whenever the transducer signal level passes a predetermined signal level;

clock means providing clock signal pulses;

a counter connected to said threshold detection signal means, the counter receiving the clock signal pulses, the counter providing a confirmation output whenever a ratio of clock signal pulses and changes in a state of the transducer signal exceeds a predetermined ratio.

10. Monitoring system as described in claim 9, further characterized by:

a switching device, receiving the clock signal pulses, and connected to the counter so as to receive the confirmation output, the switching device providing an affirmative signal in response to the confirmation output and maintaining the affirmative signal for a time period determined, at least in part, by the clock signal pulses, thereby allowing successive confirmation outputs to maintain provision of the affirmative signal.

11. Monitoring system as described in claim 10, further characterized by:

the transducer element being a diode which converts electrical energy into light energy.

12. Monitoring system for an electro-optical converter which transmits information on an optical data bus, in which a transducer element has at least one electrical connection and the electrical connection has a transducer signal level which varies in response to Manchester-encoded data being supplied to the transducer element, characterized by:

means for monitoring electrical events at said electrical connection and for determining if said events exceed a predetermined frequency of occurrence.

13. Monitoring system as described in claim 12, further characterized by:

the transducer element being a diode which converts electrical energy into light energy.

* * * * *